Sept. 2, 1958 E. J. HERBENAR 2,849,888
POWER STEERING APPARATUS
Filed Aug. 23, 1954 2 Sheets-Sheet 1
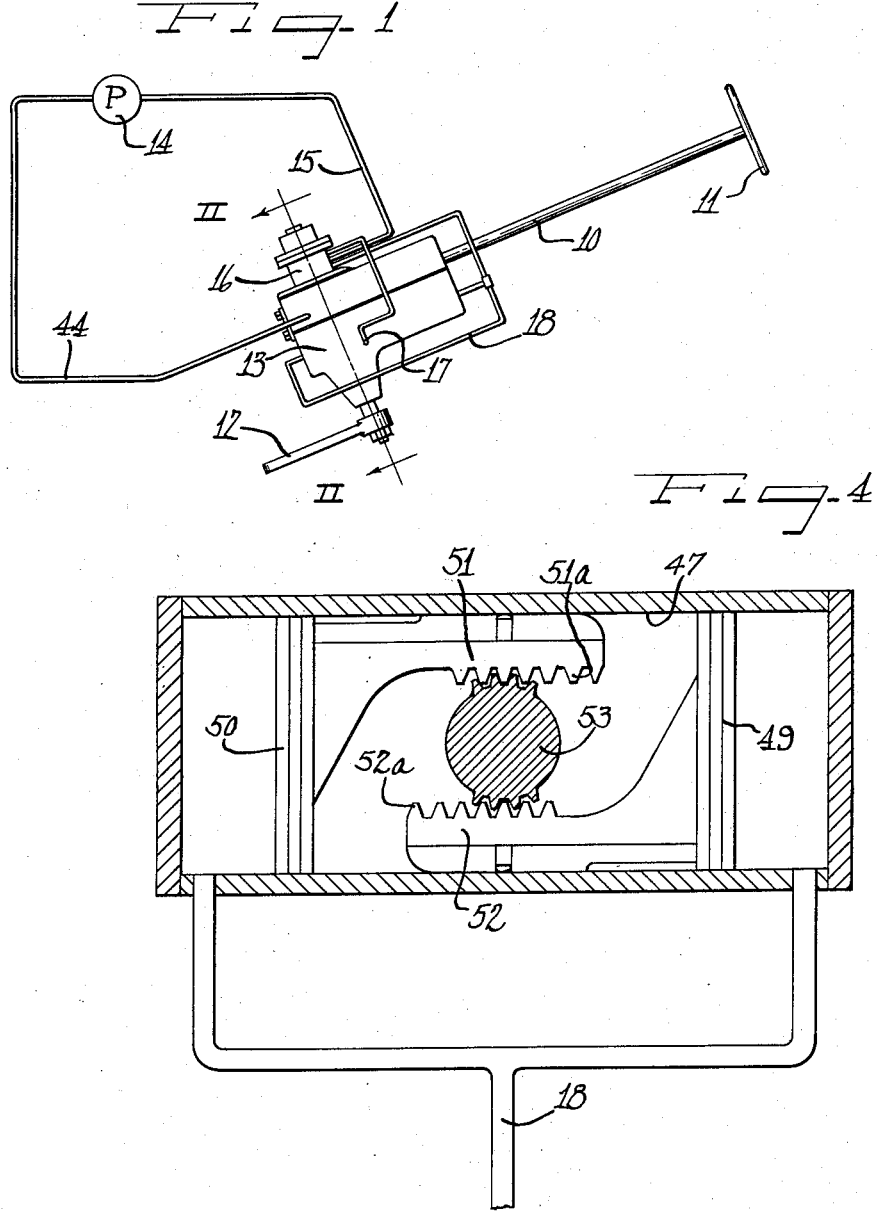
Edward J. Herbenar

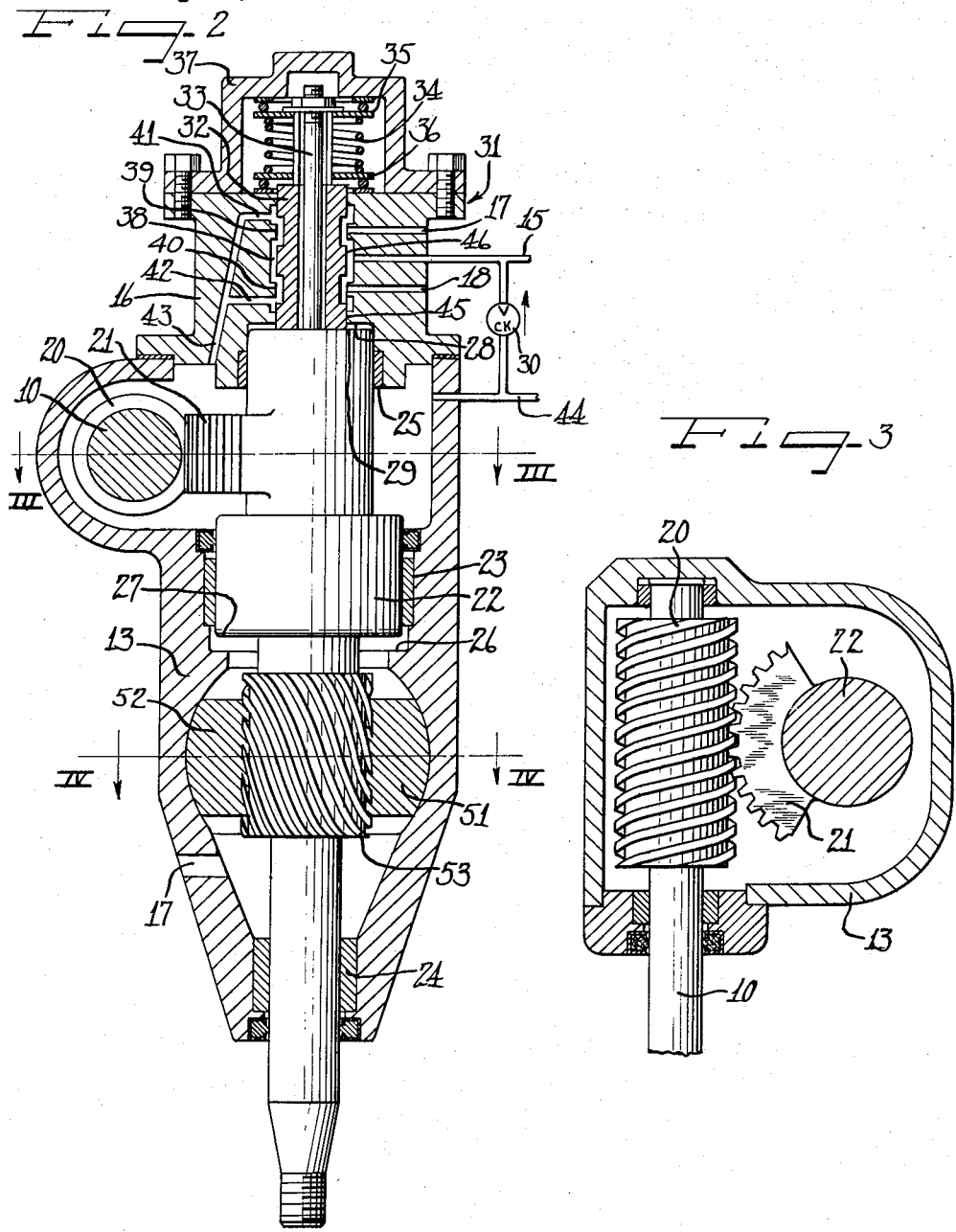

United States Patent Office 2,849,888
Patented Sept. 2, 1958

2,849,888

POWER STEERING APPARATUS

Edward J. Herbenar, Detroit, Mich., assignor to Thompson Products, Inc., Cleveland, Ohio, a corporation of Ohio Application August 23, 1954, Serial No. 451,529

13 Claims. (Cl. 74—388)

The present invention relates to apparatus for providing a power assist to manual operation of steering devices or the like. More particularly, the invention is concerned with the provision of a compact power assist unit for the dirigible wheels of a vehicle and which has a direct "feel" whereby the amount of power supplied by the power assist may at all times be sensed by the operator.

Many systems have been proposed for providing power steering for automotive vehicles, boats and other steered devices. These systems have included electrical, hydraulic, and mechanical arrangements and have been in most cases relatively complex. The complexity has been increased further by the desire of the automotive industry and others to provide a power assisted steering system in which the operator can, through his sense of feel, at all times tell the extent of application of steering effort. To my knowledge, the systems that have provided such "feel" have relied upon hydraulic circuits for accomplishing this function or, alternatively, have relied upon mechanical linkages of a rather complex nature.

As is well known in the art, the recent trend has been toward the greater and greater use of power assists of every sort. Further, the buying public has demanded the provision of power steering systems in inexpensive vehicles. However, the cost of the complex hydraulic and/or mechanical power steering systems heretofore known has been prohibitive as far as the less expensive makes of vehicles are concerned. Accordingly, many attempts have been made to construct a power assist device capable of inexpensive manufacture while at the same time performing all of the necessary and desired functions.

By the present invention, applicant has provided a power steering apparatus having "feel back" and which is extremely simple and compact and which is, therefore, capable of installation in inexpensive automotive vehicles or the like.

According to the present invention the feel back is provided by a mechanical system of reaction gearing through which the forces applied by the power booster to the steering wheels are proportionally reflected directly back through the steering gearing system to the operator. By this arrangement, an extremely safe steering unit is provided which is suitable for inexpensive installations thereby bringing the desirable features of power steering to a much larger segment of the public.

In accomplishing the aforesaid improvements, applicant utilizes a steering gear having a conventional steering worm which cooperates with a generally conventional sector. The sector is mounted on a cross or rock shaft which is mounted for slight axial movement as well as rotary movement. The steering shaft worm and the cross shaft sector are provided with helical gearing whereby rotation of the steering shaft will, in response to a steering load at the vehicle wheels, cause the cross shaft to reciprocate in one direction or the other depending upon the direction of steering torque. This reciprocatory movement of the cross shaft operates a spring centered control valve for a power motor which is geared by means of a rack and pinion arrangement to the cross shaft to cause rotation thereof in response to actuation of the control valve. The connection between the rack and the gear pinion connecting power motor to the cross shaft is through slightly helical gear teeth arranged to cause reciprocation of the cross shaft in response to a rotary power input from the power motor. By the helical connection between the power motor and the rock shaft, the rock shaft is caused to reciprocate in opposition to the reciprocation caused by the helical gearing connection between the steering shaft and the sector. Thus, a direct feel force is applied against the steering shaft which may be felt as the operator attempts to turn the latter against both the valve and the power motor feel resistance.

It is, therefore, an object of the present invention to provide a novel and highly compact power steering system.

Still another object of the present invention is to provide a power steering system having mechanical, positively applied, feel-back.

Yet a further object of the present invention is to provide a combined hydraulic and mechanical power system wherein a hydraulic power booster is utilized as an assist for manual steering operation and wherein feelback is provided at the steering shaft by means of a direct mechanical connection rather than through a hydraulic circuit.

A feature of the invention resides in a helical gearing connection between the power assist motor and the cross shaft of a steering gear box.

Another feature of the invention resides in the utilization of a reciprocably mounted cross shaft which is urged oppositely by the application of a manual steering effort and the application of a power assist.

Yet a further object of the invention is to provide a simple and hence extremely inexpensive power steering system having a minimum of hydraulic circuitry while still providing desirable feel-back.

Still a further object of the invention is to provide a simplified power steering unit wherein the power assist motor and the power assist motor-controlling valve are all constructed in a single unitary steering gear housing.

Still other and further objects and features of the present invention will at once become apparent to those skilled in the art from a consideration of the attached drawings wherein the preferred form of the present invention is shown by way of illustration only; and wherein:

Figure 1 is a side elevational view of a steering shaft and power steering mechanism constructed according to the present invention;

Figure 2 is a cross sectional view taken along the line II—II of Figure 1 and illustrating the internal construction of the gear box shown in Figure 1;

Figure 3 is a cross sectional view taken along the line III—III of Figure 2; and Figure 4 is a cross sectional view taken along the line IV—IV of Figure 2 and illustrating the details of the power motor associated with the present power steering apparatus.

As shown in the drawings:

As it may be seen from consideration of Figure 1, a steering wheel shaft 10 is manually actuated by means of the conventional steering wheel 11 to actuate a conventional pitman arm 12 through reduction gearing and power assist mechanism located in the housing 13. The pitman arm 12 is connected through conventional linkage, not shown, to dirigible wheels of an automotive vehicle or the like. The hydraulic pump 14 supplies fluid under pressure through the conduit 15 to a valve housing 16 for transmission selectively to the power motor cylinder through conduit 17 or 18.

The actuation of the device and the specific structure of a preferred embodiment thereof, may be seen from the cross sectional views of Figures 2, 3 and 4. There the steering shaft 10 is shown provided with a worm 20 having helical teeth in engagement with the teeth of a conventional cross shaft sector 21. The cross shaft 22 carrying the sector 21 is supported in conventional bearings 23, 24 and 25. However, contrary to common use, the shaft 22 is permitted slight axial movement in its bearings. Axial movement is limited by abutment shoulder 26 in the housing 13 which cooperates with the abutment shoulder 27 of the cross shaft 22. While the abutments 26 and 27 prevent downward movement of the shaft 22, additional shoulders 28 and 29 on the valve housing 16 and shaft 22 respectively are provided for preventing excessive upward movement.

In view of the helical nature of the teeth of the worm 20 and the sector 21, the transmission of torque through the worm and sector gearing will initially cause an axial movement of the cross shaft 22 in one direction or the other depending upon the direction of torque application. This reciprocatory movement is utilized in the present invention for the actuation of a reciprocating spool valve generally indicated at 31 and comprising an annularly grooved spool valve core 32 supported on an attachment rod 33 secured to the upper end of the cross shaft 22. As may be seen, the core 32 cooperates with a series of annular valve grooves in housing 16 and accordingly reciprocation of the core 32 will cause a relative movement between the core 32 and the housing 30 to control fluid flow from the pump 14 to the motor control conduits 17 and 18.

The valve core 32 as well as the cross shaft 22 to which it is attached, are centered by means of a centering spring 34 cooperating with a pair of roller bearing mounted abutment disks 35 and 36 in contact with the valve housing cap 37 and the top surface of the valve housing 16 respectfully. Accordingly, movement of the valve core 32 away from the neutral position in either direction is resisted by the spring and the valve core will, upon the removal of steering torque will be recentered by the spring into the valve-neutral position.

The valve 31 is preferably a continuous flow-type of spool valve. Thus, fluid under pressure is applied from the pump 14 through the conduit 15 to the annular inlet groove 38. If the valve is in neutral condition, the fluid in the groove 38 is equally divided and flows past the lands 39 and 40 to the exhaust passages 41 and 42 respectively which lead to the single exhaust conduit 43. The conduit 43 in turn leads to the housing 13 to lubricate the worm and sector and from thence to the pump or return conduit 44 leading to the pump 14.

When the valve core 32 is reciprocated in either direction, flow is cut off from the pump and is directed to the selected power cylinder. Thus, should the spool valve core 32 be moved upwardly, the annular land 45 on the spool 32 will cooperate with the land 40 to close off exhaust passage 42 from source 15 and the annular land 46 will cooperate with the land 39 to close off the exhaust passage 41, as well as the conduit 17, from the source of fluid pressure 15. Thus, fluid pressure is directed solely to the conduit 18 leading to a power cylinder to be described below while the opposite power cylinder is vented to the pump through the discharge passage 41. Reverse actuation of the valve core 32 will, of course, reverse the connections to connect conduit 17 to the source 15 and the conduit 18 to the sump passage 42.

An extremely compact power cylinder unit is provided in the present power steering system and is shown in cross section in Figure 4. There, the cylinder 47, which may be integral with the housing 13 or secured therewithin, encloses a pair of opposed pistons 49 and 50 carrying reciprocable racks 51 and 52 respectively.

The rack teeth 51a and 52a cooperate with a cross shaft pinion gear 53 and cause the gear 53 to rotate in the direction of manual torque application to the cross shaft 22 to thereby provide a power assist. For a complete discussion of the characteristics of the dual opposed piston single cylinder motor herein shown at 47, attention is drawn to my prior copending application Serial No. 395,799, filed December 2, 1953.

Feel-back is provided in the present system by means of a helical connection between the pinion 53 and the racks 51 and 52. In view of the fact that resistance to steering movement is applied to the cross shaft 22 by means of the pitman arm 12, a load resistance is applied against the action of the power motor 47. By providing the pinion 53 and the racks 51 and 52 with helical teeth having a relatively slight pitch, the resistance offered by the cross shaft 22 to rotation by the fluid motor will cause a reciprocation of the cross shaft along its longitudinal axis.

Utilizing gearing having helical pitch of the direction shown in the Figures 2 and 3, it will be apparent that clock-wise rotation of the shaft 10 as viewed in Figure 2, will cause counter-clockwise rotation of the cross shaft 22 and will simultaneously cause an application of a force axially downwardly on the cross shaft. Movement of the cross shaft downwardly will cause the valve core 32 to move downwardly thereby applying pressure from the pump 14 to the conduit 17 causing the pistons 49 and 50 to separate, thereby applying counter-clockwise rotation to the cross shaft 22 through pinion 53 in aid to the manual power applied thereto by the steering shaft 10.

The attempted separation of the pistons 49 and 50 acting upon the helical teeth of the pinion 53 will simultaneously cause an upward movement of the cross shaft 22 in opposition to the downward movement applied thereto by the manual steering shaft and worm as above discussed. This counter-acting upward movement produces a feel readily discernible by the operator of the steering system and which is directly portional to the power applied to the shaft 22 by the power motor to overcome steering resistance. It will of course be apparent that the amount of feel back for any given application of torque by the power motor will be governed by the pitch angle of the helical gear teeth of the pinion 53 and racks 51 and 52. It will further, also, be apparent that rotation of the steering shaft in the counter-clockwise direction as viewed in Figure 2 will cause a reaction feel opposite to that above described relative to clockwise rotation of the steering shaft thereby providing an indication to the operator of the steering torque being applied at any instant.

As a safety feature, check valve 30 is provided between conduits 15 and 44. This valve permits flow from the sump 44 to the conduit 15 if the pump should stop operation, thereby permitting circulation of fluid to allow manual operation of the system.

From the above description it will be apparent that I have provided a novel and extremely compact power steering assembly providing a direct feel-back. The feel-back provided in the instant construction is mechanical and requires no hydraulic plumbing or complex valve constructions utilized in the prior art. This elimination of excess parts permits a minimization of attachments to the basic power steering assembly and permits its inclusion in an extremely small and compact outer housing. In fact, in installations wherein it is desired that the outer housing 13 incorporate integrally therewith the power cylinder 47, it is possible to eliminate all external hydraulic conduits relative to the valve and the power motor by running the conduits 17 and 18 through the walls of the housing 13 for end to end coupling with similar passages and the valve housing 16 when the housings 13 and 16 are fitted together. Such an arrangement, which could be accomplished by proper coring during the casting of the housings 13 and 16 will permit the manufacture of the entire assembly at a very reasonable cost.

It will be apparent to those skilled in the art that variations and modifications may be made in the above described structure without departing from the novel concepts of the present invention. For example, it will be understood that the valve core 32 need not be connected directly to the end of the cross shaft 22 but may instead be reciprocably mounted in any convenient position in or near the housing 13 and connected to the end of the shaft 22 by means of a suitable lever arm. Further, it will be understood that feel-back may be provided by incorporating hydraulically actuated piston means in the valve housing 16 for urging it in opposition to the force applied by the steering worm 20. In such an alternative arrangement the connection between racks 51, 52 and the pinion 53 would preferably be through straight spur gearing rather than through the helical gearing shown. In view of the variations and modifications which will thus suggest themselves to those skilled in the art, it is intended that the scope of the present invention be limited solely by the appended claims.

I claim as my invention:

1. In a power booster system, a first manually actuated rotary shaft, a second shaft extending generally transversely of said first shaft, helical gearing drivingly connecting said shafts whereby rotation of said first shaft causes rotation and reciprocation of said second shaft, a valve operable by reciprocation of said second shaft to apply fluid under pressure to a power motor, and helical gearing connecting said motor to said second shaft whereby the application of power to said second shaft by said motor urges rotation and reciprocation thereof, the pitch of the separate helical gearing connections operating to urge axial movement of the second shaft in opposite directions whereby actuation of said motor by reciprocation of said valve causes a mechanical force against said second shaft urging said valve closed.

2. In a power assist system, a first manually rotatable shaft, a second driven shaft lying generally transversely of said first shaft and drivingly connected thereto by means of helical gearing, means supporting said second shaft for rotation and slight reciprocation whereby manual turning movement by said first shaft will cause rotation and reciprocation of said second shaft through said gearing, a valve operatively connected to said second shaft for actuation thereby in response to reciprocation thereof to apply power to a power motor, and helical gearing means connecting said motor to said second shaft for rotating said second shaft in the direction of rotation applied by said first shaft and for reciprocation of said second shaft, said last named means operating to reciprocate said second shaft in opposition to the reciprocation urged by said first shaft whereby the power applied by said motor is indicated to the operator of said first shaft.

3. In a power assist system for an actuated shaft, a second shaft transverse to said actuated shaft and connected thereto by helical gearing to drive said actuated shaft rotatively and reciprocably, a power motor, means for connecting said power motor to said actuated shaft, said last named means comprising a helical gear connection, and a valve operably connected to said actuated shaft for reciprocation by said actuated shaft when said actuated shaft is reciprocated by said second shaft, said valve being operable to control the application of power by said motor when said actuated shaft is reciprocated, said helical gear connection between said motor and said actuated shaft having a pitch operable to oppose reciprocation of said actuated shaft by said second shaft.

4. A power booster apparatus for steering gear linkages or the like comprising a steering wheel shaft having a worm thereon, a cross shaft positioned transversely of said steering wheel shaft and having a sector thereon for cooperation with said worm, bearing means supporting said cross shaft for rotation and slight reciprocation whereby rotation imparted to said worm will cause rotation and also reciprocation of said cross shaft, power actuated means connected to said cross shaft through a helical connection, and a valve actuated by reciprocation of said cross shaft to control the application of said power, the pitch of said helical connection between said source of power and said cross shaft being operable to urge said cross shaft to reciprocate in a direction opposite to the reciprocation imparted by rotation of said steering shaft whereby torque applied by said source of power is directly applied against said steering shaft to provide feel.

5. In a power booster system, a valve actuating shaft, means for reciprocating said shaft in response to a rotary torque applied manually to an associated shaft for rotating an output shaft, power means for rotating said output shaft in the same direction as said manual torque application and a helical gearing connection between said power means and said valve shaft whereby said valve shaft is reciprocated by said power motor simultaneously with the actuation of said rotary shaft, said reciprocation of said valve shaft by said power means being in opposition to the reciprocation of said valve shaft in response to manual torque application.

6. In a hand and power system, manual gearing, a valve shaft rigidly secured to said gearing, means for reciprocating said valve shaft upon application of rotary torque to said gearing, a power motor under the control of said valve, means for applying the power from said motor to said shaft for the rotation thereof in response to reciprocation of said valve, and means at the connection between said motor and said valve shaft for reciprocating said valve shaft in opposition to the reciprocation applied thereto by said rotary torque input.

7. A power steering system comprising a steering wheel shaft, and a steering output shaft, helical gear means rigidly connected to each of said shafts and intermeshed to connect said shafts for transmitting torque manually applied to said steering shaft to said output shaft, valve means connected for axial movement with said output shaft, said gear means comprising means for applying slight reciprocation to said valve means upon the transmission of torque through said gear means power motor means rotatably drivingly connected with said output shaft and under the control of said valve, and means connecting said motor to said output shaft for reciprocation thereof in opposition to reciprocation of said valve in response to said rotary torque input to said steering shaft, whereby movement of said steering shaft and gear means to move said valve is opposed by said motor when said motor is operated in response to reciprocation of said valve by said steering shaft.

8. In combination in a power steering assembly, a power output shaft connected for actuation of steering linkage, and a manual steering input shaft drivingly connected to said output shaft through a worm and sector gearing connection, means for supporting said output shaft for rotation to actuate said linkage and for reciprocation in response to torque applied thereto through said worm and sector gearing, power motor means drivingly connected to said output shaft through helical gearing whereby actuation of said output shaft by said power motor causes rotation of said output shaft in the same direction as caused by said steering shaft and causes reciprocation of said output shaft in opposition to reciprocation of said output shaft caused by said steering shaft.

9. In combination in a power steering assembly, a power output shaft connected for actuation of steering linkage, and a manual steering input shaft drivingly connected to said output shaft through a worm and sector gearing connection, means for supporting said output shaft for rotation to actuate said linkage and for reciprocation in response to torque applied thereto through said worm and sector gearing, power motor means drivingly connected to said output shaft through helical gearing whereby actuation of said output shaft by said power motor causes rotation of said output shaft in the same direction as caused by said steering shaft and causes reciprocation of said output shaft in opposition to reciprocation of said output shaft caused by said steering shaft, and valve means operatively connected to said output shalt for reciprocal movement thereby for supplying power to said motor in response to reciprocation of said output shaft.

10. In combination in a power steering assembly, a power output shaft connected for actuation of steering linkage, and a manual steering input shaft drivingly connected to said output shaft through a worm and sector gearing connection, means for supporting said output shaft for rotation to actuate said linkage and for reciprocation in response to torque applied thereto through said worm and sector gearing, power motor means drivingly connected to said output shaft through helical gearing whereby actuation of said output shaft by said power motor causes rotation of said output shaft in the same direction as caused by said steering shaft and causes reciprocation of said output shaft in opposition to reciprocation of said output shaft caused by said steering shaft, and valve means connected to said output shaft for reciprocation therewith for controlling source of motive fluid to said motor in accordance with the reciprocal position of said output shaft.

11. In a power assist system, a first manually actuated rotary shaft, a second shaft extending generally transversely of said first shaft, helical gearing rigidly connected to each of said shafts and intermeshed to connect said shafts whereby rotation of said first shaft causes rotation and reciprocation of said second shaft, a valve operated by reciprocation of said second shaft to direct fluid under pressure to a power motor, means connecting said motor to said second shaft for rotation thereof in the same direction urged by the rotation of said first shaft, and means urging said valve to reciprocate in opposition to the direction of reciprocation caused by said rotation of said first shaft.

12. In a power assist system, a first manually actuated rotary shaft, a second shaft extending generally transversely of said first shaft, helical gearing connecting said shafts whereby rotation of said first shaft causes rotation and reciprocation of said second shaft, a valve operated by reciprocation of said second shaft to direct fluid under pressure to a power motor, means connecting said motor to said second shaft for rotation thereof in the same direction urged by the rotation of said first shaft, and means urging said valve to reciprocate in opposition to the direction of reciprocation caused by said rotation of said first shaft, said last named means comprising a helical connection between said motor and said second shaft.

13. In a power assist system, a first manually actuated rotary shaft, a second shaft extending generally transversely of said first shaft, helical gearing rigidly connected to each of said shafts and intermeshed to connect said shafts whereby rotation of said first shaft causes rotation and reciprocation of said second shaft, a a valve operated by reciprocation of said second shaft to direct fluid under pressure to a power motor, means connecting said motor to said second shaft for rotation thereof in the same direction urged by the rotation of said first shaft, said last named means including means urging said valve to reciprocate in opposition to the direction of reciprocation caused by said rotation of said first shaft.

References Cited in the file of this patent
UNITED STATES PATENTS

| 1,914,267 | Leupold | June 13, 1933 |
| 2,053,272 | Eaton | Sept. 8, 1936 |
| 2,061,120 | Vorech | Nov. 17, 1936 |
| 2,081,954 | Kenyon | May 18, 1937 |
| 2,213,271 | Davis | Sept. 3, 1940 |
| 2,362,930 | Robbins | Nov. 14, 1944 |
| 2,583,407 | Binder | Jan. 22, 1952 |

OTHER REFERENCES

Automotive Industries, pp. 54–57, April 15, 1954.